No. 791,207. PATENTED MAY 30, 1905.
H. S. PALMER.
MACHINE FOR MOLDING BUILDING OR OTHER BLOCKS.
APPLICATION FILED AUG. 30, 1902.

3 SHEETS—SHEET 1.

Witnesses:
Jas. E. Hutchinson.
Gus. B. Prindle

Inventor.
Harmon S. Palmer,
by Edwin J. Prindle, his Atty.

No. 791,207. PATENTED MAY 30, 1905.
H. S. PALMER.
MACHINE FOR MOLDING BUILDING OR OTHER BLOCKS.
APPLICATION FILED AUG. 30, 1902.

3 SHEETS—SHEET 3.

Witnesses:
Jas. E. Hutchinson
Geo. B. Prindle

Inventor.
Harmon S. Palmer,
by Edwin J. Prindle, his Atty

No. 791,207. Patented May 30, 1905.

UNITED STATES PATENT OFFICE.

HARMON S. PALMER, OF WASHINGTON, DISTRICT OF COLUMBIA, ASSIGNOR TO HARMON S. PALMER HOLLOW CONCRETE BUILDING BLOCK COMPANY, OF WASHINGTON, DISTRICT OF COLUMBIA, A CORPORATION OF VIRGINIA.

MACHINE FOR MOLDING BUILDING OR OTHER BLOCKS.

SPECIFICATION forming part of Letters Patent No. 791,207, dated May 30, 1905.

Application filed August 30, 1902. Serial No. 121,606.

*To all whom it may concern:*

Be it known that I, HARMON S. PALMER, of Washington, District of Columbia, have invented a certain new and useful Improvement in Machines for Molding Building or other Blocks; and I do hereby declare that the following is a full, clear, and exact description thereof, reference being had to the accompanying drawings, in which—

Figure 1:
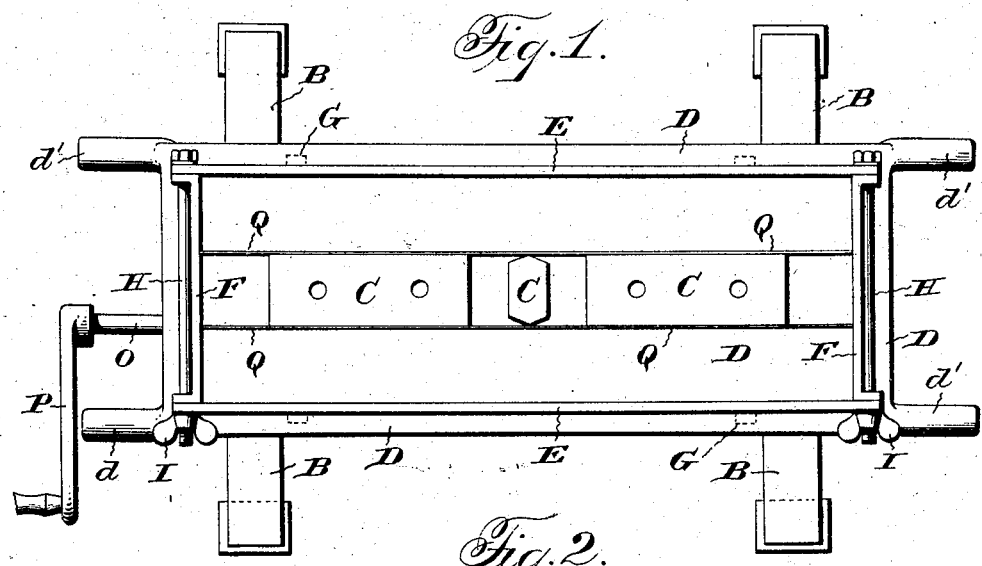
Figure 2:
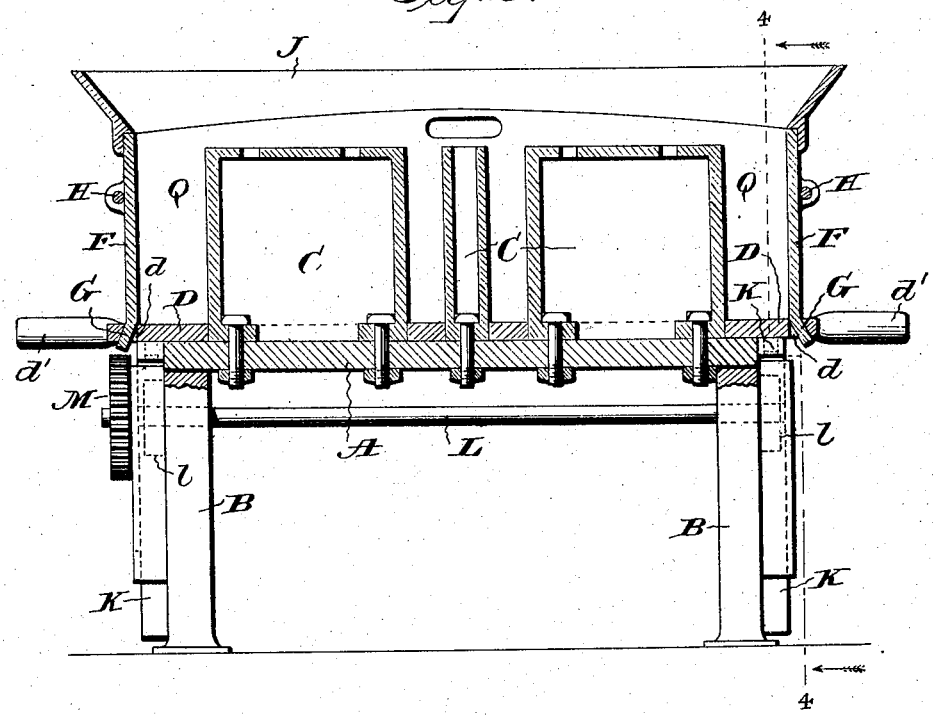
Figure 3:
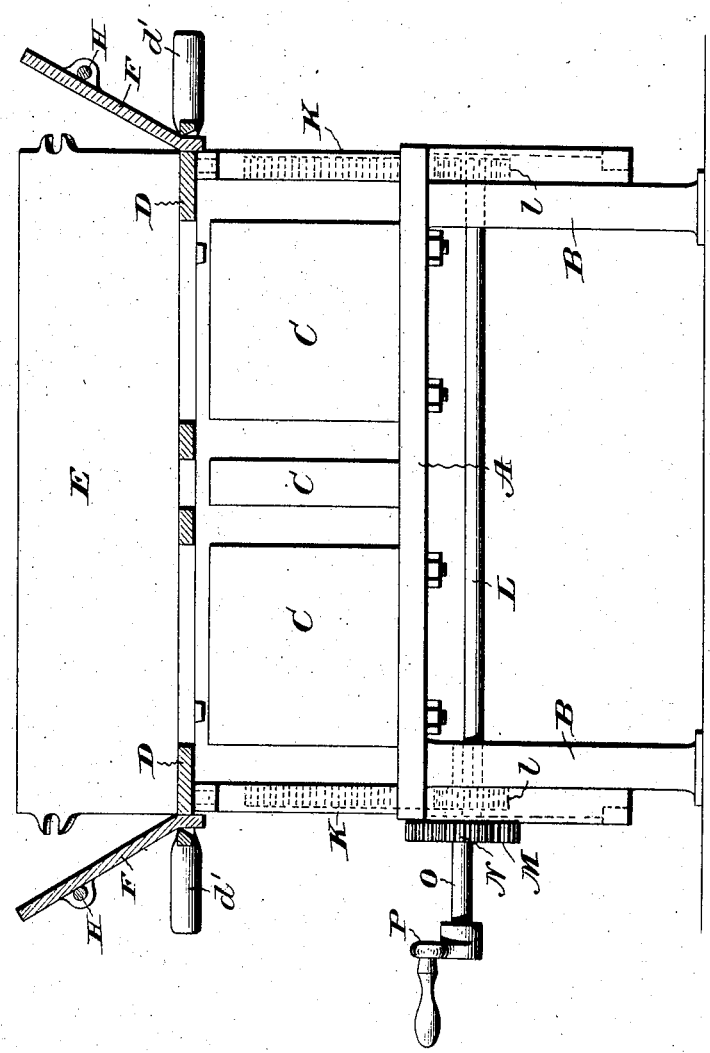
Figure 4:
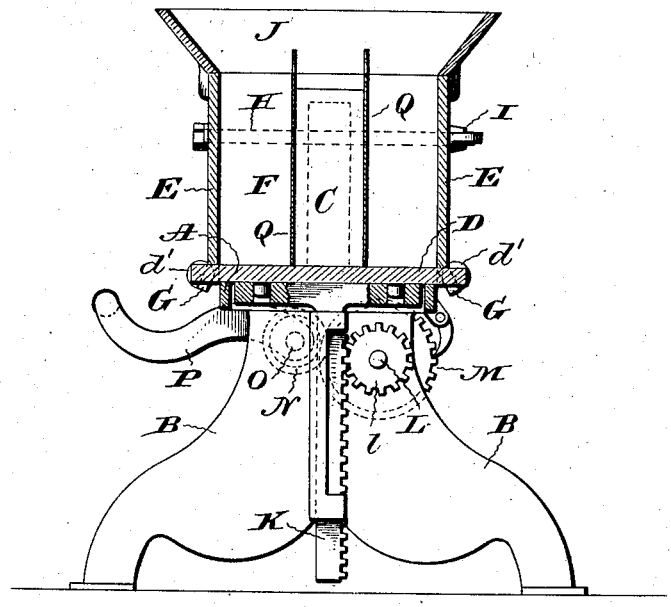
Figure 5:
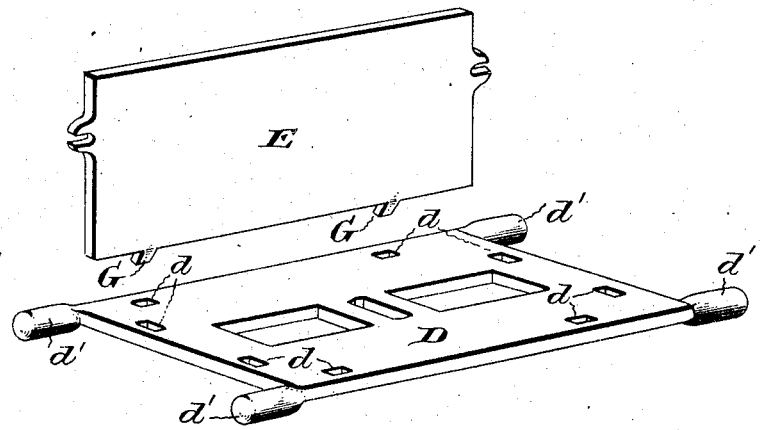

Figure 1 is a top plan view of a machine embodying my invention; Fig. 2, a longitudinal section of the same, the machine being in position for molding; Fig. 3, a similar view, the machine being illustrated with the parts in position after a block has been molded and lifted preliminary to removal; Fig. 4, a cross-section on the line 4 4 of Fig. 2, and Fig. 5 is a detail view in perspective of the bottom plate and one of the sides separated from each other.

My invention relates to machines for molding blocks for building or other purposes—such, for example, as the building-block patented to me in Letters Patent of the United States No. 674,874, dated May 28, 1901—my object chiefly being to improve upon the machine for which I obtained United States Patent No. 623,686, dated April 25, 1899, to the end that the construction may be simplified, the cost of manufacture reduced, and the operation rendered more convenient and easier; and with these objects in view my invention consists in the machine having the features of construction substantially as hereinafter specified and claimed.

In producing my present invention I have made the radical departure from the machine of my Patent No. 623,686 of mounting the cores on a stationary support and making the bottom and side and end walls of the mold vertically movable to free the newly-formed blocks from the cores, and as a result of this difference in construction a shorter supporting-frame can be employed, so that less metal is required for the frame, the machine being thereby lightened in weight and cheapened in cost. The mold is lowered, so that the placing of the material therein and working it are facilitated, and the bottom plate upon which the blocks are formed can be used to remove the block from the machine without the employment of special and additional devices, this also being a factor in simplifying and cheapening the machine and facilitating the work of making blocks.

In the embodiment of my invention which has been selected for illustration a framework is employed that comprises a table or bed A, mounted upon legs B, and rising from the upper side of the bed are one or more cores C, the number and size of the cores being determined by the number of the blocks to be made in the machine and the size of the openings to be formed in the blocks. Of course the number, form, and size of the cores has nothing to do with the invention, and they will vary in different machines. The cores C are fixed to the table A, and they may be cast integral therewith or separately made and attached thereto by bolts. The bottom of the mold consists of a movable plate D, having holes for the passage of the cores, and there are two side plates E and two end plates F, that are removably attached to the bottom plate. The connection between the side and end plates and the bottom plate preferably consists of one or more lugs G on the lower edge of each of said plates that incline downward and outward and respectively interlock with holes $d$ in the bottom plate D when the mold-walls are in position for forming blocks. For securing the mold-walls together when they are in position for molding any desired means may be used. A simple and convenient device for this purpose is a bolt H, that passes through lugs on each end wall and through slots in the adjacent end of the two side walls and a thumb-nut I on the bolt. A removable hopper J, similar to one used in the machine of my Patent No. 673,686, is preferably employed.

Inasmuch as the side and end plates are removably attached to the bottom plate, the inner surfaces of these plates are given the configuration which it is desired to impart to the outer surfaces of the blocks to be made, and therefore it is unnecessary to employ what is, in effect, the double wall, which characterizes my heretofore-patented machine. By the use of a single plate for each end or side wall the machine is lightened in weight and cheapened in cost and yet the walls can be changed whenever it is desired to vary the configuration of the blocks to be made.

At each end of the bottom plate D two handles $d'$ are provided, by which the plate and the block thereon may be conveniently removed from the machine and carried to the place for setting or hardening, the provision of handles on the bottom plate being possible by reason of the connection of the walls with the bottom plate and making them movable therewith instead of connecting the walls to the stationary bed of the machine. With my present machine it is therefore unnecessary to employ a special plate lifting and carrying device.

Any desired mechanism may be employed for raising and lowering the bottom plate; but I preferably use mechanism similar to that shown in my Patent No. 623,686 for raising and lowering the cores, said mechanism comprising a pair of racks K, the upper ends of which support the bottom plate, pinions $l$, that engage said racks and mounted on a shaft L, a gear M on the shaft L, meshing with a pinion N on a shaft O, and a crank P on the shaft O.

The use of the machine described is briefly as follows: The blocks being formed, the crank P is revolved to cause the lifting of the mold, with the blocks therein, until the bottom plate D is raised to a position on a level with or above the top of the cores C. Then the hopper J is removed, and the side and end walls being freed from each other by releasing the bolts H said walls are each tilted away from the newly-formed blocks sufficiently to permit the lugs of the walls that engage the bottom plate to be disengaged from the latter and the walls thus removed. Workmen now take the bottom plate by means of the handles thereon and carry it, with the newly-formed blocks upon it, to the place for the setting or hardening of the blocks. Another bottom is now applied to the machine, to which the same side and end plates are attached, if blocks of the same surface configuration are to be used, or other plates may be substituted for them, and the hopper being applied and the walls secured together the machine is in readiness for making another set of blocks.

To enable my machine to be used in the manufacture of solid blocks, I provide thin, preferably sheet-metal, plates Q, having a length to extend from end to end of the mold, which are respectively placed on opposite sides of the cores, being supported by the latter, and thus form a mold on each side of the cores, said plates thus being, in effect, removable walls or partitions. When blocks are formed by the use of said removable walls and the mold is lifted to disengage the bottom plate from the cores, said plates being deprived of the support which the cores afford readily fall away from the newly-formed blocks. Of course, if desired, only one plate Q need be used at a time.

Having thus described my invention, what I claim is—

1. In a means for molding polygonal blocks of concrete, the combination of a support, a fixed core or cores projecting therefrom and a mold-box comprising a removable bottom and sides and ends that are laterally movable, whereby they may be moved from a newly-formed block, said bottom, sides and ends being adapted to be raised and lowered about said cores, for the separation of a newly-formed block from the cores.

2. In a means for molding polygonal blocks of concrete, the combination of a support, a fixed core or cores, projecting therefrom, a mold-box comprising a removable bottom and sides and ends that are laterally movable, whereby they may be moved from a newly-formed block, and gearing for raising said bottom, sides and ends relative to the cores for the separation of the newly-formed block therefrom.

3. In a means for molding polygonal blocks of concrete the combination of a stationary core or cores, and mold bottom and walls, the connection between the bottom and walls being detachable and consisting of downwardly and outwardly inclined lugs on the walls that engage holes in the bottom, the bottom and walls being movable vertically.

4. In a means for molding polygonal blocks of concrete the combination of a core-supporting bed, and mold bottom and walls that are separably connected, and mechanism for raising and lowering the mold-bottom.

5. In a molding-machine the combination of a mold having a core, and a removable plate adapted to be supported in the mold between the core and the side of the mold whereby solid blocks may be formed.

6. In a molding-machine the combination of a mold having a core, and a removable plate adapted to be supported in position by the core between the latter and the side of the mold whereby solid blocks or blocks without cavities or recesses may be formed.

7. In a molding-machine the combination of a mold having a core unconnected with the mold whereby independent movement of core and mold may be given, and a removable plate or plates adapted to be supported by the core between the latter and the side of the mold whereby solid blocks or blocks without cavities or recesses may be formed.

In testimony that I claim the foregoing I have hereunto set my hand.

HARMON S. PALMER.

Witnesses:
CHAS. J. WILLIAMSON,
W. E. WRIGHT.